(12) United States Patent
Teter

(10) Patent No.: US 7,941,472 B1
(45) Date of Patent: May 10, 2011

(54) SERIAL CORRELATOR ARCHITECTURE

(75) Inventor: Michael A. Teter, Riverside, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1393 days.

(21) Appl. No.: 11/409,817

(22) Filed: Apr. 24, 2006

(51) Int. Cl.
*G06F 17/15* (2006.01)

(52) U.S. Cl. ............................................. 708/422

(58) Field of Classification Search .................. 708/422
See application file for complete search history.

(56) References Cited

U.S. PATENT DOCUMENTS

| | | | |
|---|---|---|---|
| 3,604,911 A * | 9/1971 | Schmitt | 708/422 |
| 3,701,894 A * | 10/1972 | Low et al. | 708/422 |
| 3,717,756 A * | 2/1973 | Stitt | 708/422 |
| 5,376,939 A | 12/1994 | Urkowitz | |
| 5,818,868 A | 10/1998 | Gaudenzi et al. | |
| 5,999,561 A | 12/1999 | Naden et al. | |
| 6,038,271 A | 3/2000 | Olaker et al. | |
| 6,438,182 B1 | 8/2002 | Olaker et al. | |
| 6,493,405 B1 | 12/2002 | Olaker et al. | |

* cited by examiner

*Primary Examiner* — Chuong D Ngo
(74) *Attorney, Agent, or Firm* — Duane Morris LLP

(57) ABSTRACT

An apparatus for correlating multibit first and second words includes a multiplexer for selecting one bit at a time of the second word, and applying the bit to a multiplier which receives the first word, for generating a product by inverting or noninverting the first word. The product is applied to an adder and is added to a delayed parallel signal to produce a sum signal. The sum signal is delayed in an amount related to the number of bits in the first word to produce the delayed parallel signal. A plurality of such apparatuses are cascaded, with the bits of the second word applied in subsets to the apparatuses, and the partial correlations applied as input words to the next apparatus in the cascade.

5 Claims, 4 Drawing Sheets

*FIG. 3A*
*FIG. 3B*
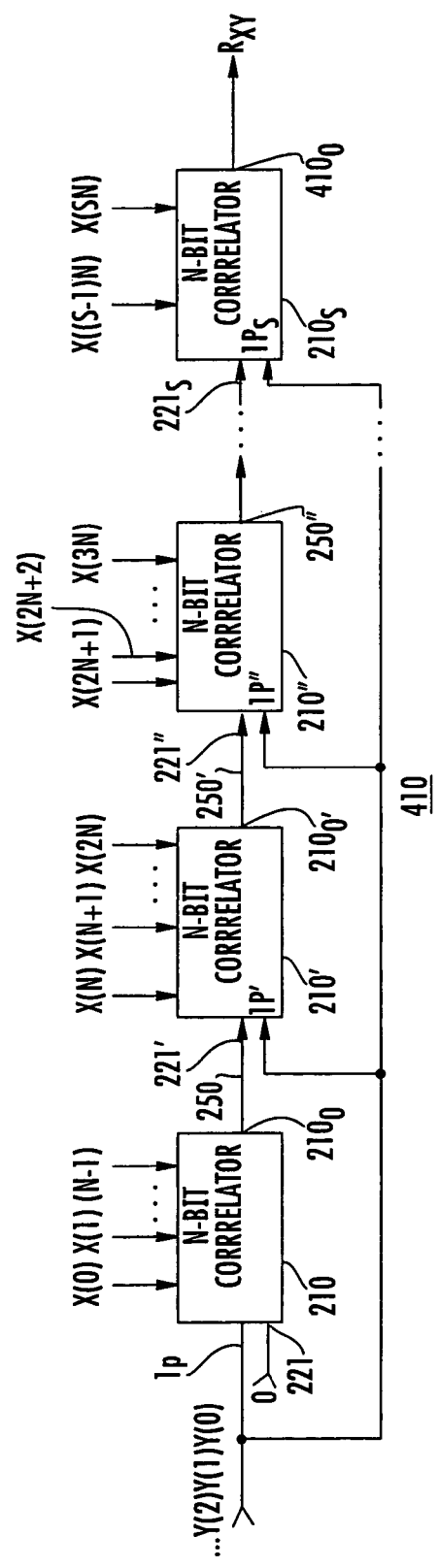
*FIG. 4*

SERIAL CORRELATOR ARCHITECTURE

GOVERNMENTAL INTEREST

This invention was made with government support under Contract/Grant ltn492cdvt00 under program COTS/DV. The United States Government has a non-exclusive, non-transferable, paid-up license in this invention.

FIELD OF THE INVENTION

A correlator architecture performs correlation between digital signals using a particular architecture including multiplexers and multipliers.

BACKGROUND OF THE INVENTION

Correlation is widely used in signal processing, to help to identify the presence of particular signal sequences. One form of correlation is described in the context of a radar system in U.S. Pat. No. 5,376,939, issued Dec. 27, 1994 in the name of Urkowitz.

Correlation processing is described generally by the equation $$R_{xy} = \int X(n) Y(n-k) dn \quad (1)$$

and discrete correlation can be represented by $$R_{yx} = \sum_{n=0}^{N-1} X(n) Y(n-k) dn \quad (2)$$

Structure 10 of FIG. 1a illustrates a portion of a prior-art correlator structure which is well adapted to being fabricated on or in an Application-Specific Integrated Circuit (ASIC). ASICs are advantageous in that the desired structure can be selected and optimized in a relatively small integrated circuit. However, ASICs have long design and fabrication cycles, and can be expensive, especially if the number of units to be fabricated is small.

Structure 10 of FIG. 1a illustrates a portion of a correlator structure which is well adapted for fabrication on an ASIC. In FIG. 1a, a source 1 of first signal produces parallel signal, designated Y, and applies it by way of a path 1p to an input port 10i1 of a correlator illustrated as a block 10. A source 2 of second signal produces parallel signal on a path 2p for application to a second input port 10i2 of correlator block 10. Correlator 10 correlates the first signals Y with the second signals X and produces at its output port 10o a signal Rxy representing the correlation.

FIG. 1b illustrates details of one possible prior art embodiment of correlator 10 of FIG. 1a. In FIG. 1b, correlator 10 includes a clocked multibit register (R) which, at each cycle of a clock signal, gates or couples the bits of a first Y word onto a multibit bus 14. Correlator 10 also includes a set of multipliers (X) $16_0$, $16_1$, $16_2$, . . . , $16_{N-1}$ of a set 16 of multipliers. Each multiplier of set 16 includes two input ports, one of which is a multibit input port, and one of which is a single-bit input port. More particularly, multiplier $16_0$ includes a multibit input port $16i1_0$, multiplier $16_1$ includes a multibit input port $16i1_1$, multiplier $16_2$ includes a multibit input port $16i1_2$, . . . , and multiplier $16_{N-1}$ includes a multibit input port $16i1_{N-1}$. The single-bit input ports of multipliers $16_0$, $16_1$, $16_2$, . . . , $16_{N-1}$ are designated $16i2_0$, $16i2_1$, $16i2_2$, . . . , $16i2_{N-1}$, respectively. All the bits of the Y word coupled onto bus 14 from register 12 are applied to the multibit first input ports of all the multipliers. That is, when a particular Y word appears on bus 14, all the bits of that Y word are applied to each of multibit input ports $16i1_0$, $16i1_1$, $16i1_2$, . . . , and $16i1_{N-1}$. For each Y word coupled to the multibit input ports of set 16 of multipliers of FIG. 1b, the bits of a word are individually applied to the single-bit input ports $16i2_0$, $16i2_1$, $16i2_2$, . . . , $16i2_{N-1}$ of multiplier set 16. The single-bit inputs can be viewed as being "control" bits which determine the state of the multiplier. In short, each multiplier $16_0$, $16_1$, $16_2$, . . . , $16_{N-1}$ of set 16 multiplies the Y word applied to its multibit input port by either +1 or −1, depending upon the state of the "control" X bit applied to its single-bit input port. Thus, if the single X bit applied to input port $16i2_0$ of multiplier $16_0$ is a logic high (+1), the multibit Y word applied to its multibit input port $16i1_0$ is translated without change by way of a multibit path $18_0$ to an input port $20i1_0$ of an adder $20_0$, where it is added to any multibit word applied by way of a path $22_0$ to an input port $20i2_0$. As illustrated, the value of the word applied by way of a path $22_0$ to input port $20i2_0$ of adder $20_0$ is zero. In a similar manner, the multibit Y word appearing on bus 14 is coupled simultaneously to first input ports $16i1_1$, $16i1_2$, . . . , and $16i1_{N-1}$ of the remaining multipliers $16_1$, $16_2$, . . . , $16_{N-1}$ of set 16, and each multiplier of set 16 multiplies the Y word by either +1 or −1 depending upon the state of the single bit of X input signal applied to the corresponding second input ports $16i2_0$, $16i2_1$, $16i2_2$, . . . , $16i2_{N-1}$, and the resulting inverted or noninverted versions of the multibit Y signal or word are coupled to adders $20_0$, $20_1$, $20_2$, . . . , $20_{N-1}$ of a set 20 of adders. Thus, the multiplied (that is, inverted or noninverted) multibit Y word from multiplier $16_0$ is applied over path $18_0$ to input port $20i1_0$ of adder $20_0$, the multiplied multibit Y word from multiplier $16_1$ is applied over path $18_1$ to input port $20i1_1$ of adder $20_1$, the multiplied multibit Y word from multiplier $16_2$ is applied over path $18_2$ to input port $20i1_2$ of adder $20_2$, . . . , and the multiplied multibit Y word from multiplier $16_{N-1}$ is applied over path $18_{N-1}$ to input port $20i1_{N-1}$ of adder $20_{N-1}$. Each adder $20_0$, $20_1$, $20_2$, . . . , $20_{N-1}$ of set 20 of adders sums the multiplied multibit Y word (the addend) received from its associated multiplier $16_0$, $16_1$, $16_2$, . . . , $16_{N-1}$ of set 16 of multipliers with or to the multibit number (the augend) applied to its second input port. Thus, the addend applied to input port $20i1_0$ of adder $20_0$ is summed with the augend applied to input port $20i2_0$ of adder $20_0$ to produce a sum which is applied to a register (R) $24_0$ of a set of registers 24, the addend applied to input port $20i1_1$ of adder $20_1$ is summed with the augend applied to input port $20i2_1$ of adder $20_1$ to produce a sum which is applied to a register (R) $24_1$, the addend applied to input port $20i1_2$ of adder $20_2$ is summed with the augend applied to input port $20i2_2$ of adder $20_2$ to produce a sum which is applied to a register (R) $24_2$, . . . , and the addend applied to input port $20i1_{N-1}$ of adder $20_{N-1}$ is summed with the augend applied to input port $20i2_{N-1}$ of adder $20_{N-1}$ to produce a sum which is applied to a register (R) $24_{N-1}$. Each register $24_0$, $24_1$, $24_2$, . . . , $24_{N-1}$ of set 24 of registers delays the coupling of the sum from the previous adder by one clock cycle. The correlation output appears at the output port $10_0$ of register $24_{N-1}$.

In operation of the arrangement 10 of FIG. 1b, a new Y digital word is applied from register 12 to bus 14 at each clock cycle. At each clock cycle, the bits of a new X digital word are applied to the various bit input ports of multibit port or path 2p, and a multiplication occurs in the multipliers of set 16. The product is applied to the adders of set 20 and is added during the same clock cycle. This produces a sum at the output of each adder or summer of set 20 of adders. At the next clock cycle, the registers of set 20 each transfer the sum from its associated lower-numbered summer to the augend input port of the next higher-numbered adder. All registers are clocked at the same time. Parallel data Y changes on a clock-to-clock basis, but the X value does not change unless or until a different correlation is to be processed. All multiplications and additions occur on a clock-to-clock basis, and the intermediate results are stored in registers on a clock-to-clock basis. Hence the resultant output $R_{xy}$ occurs on a clock-to-clock basis in a continuous stream until all Y values have been processed. On each clock cycle, the resultant output is the correlated output of Y to X, after the first initial N clocks. As an example if N is 8, it will take 8 clock cycles for valid correlated output to propagate to the resultant output. That is, correlated output appears at port 10o only after the first N clock cycles have passed.

In some computation-intensive applications, the words being processed may contain thousands of bits. Such large numbers of processing steps can be accommodated in a reasonable number of ASICs. However, in some contexts it may be desirable to use Field Programmable Gate Arrays (FPGAs) gate-programmable arrays instead of ASICs. Field Programmable Gate Arrays are advantageous in that they are commercially made in large numbers, and are both inexpensive and reliable. A disadvantage of Field Programmable Gate Arrays is that by nature each integrated circuit contains elements which are useful for the desired function, and also contains elements which may be less useful, or not at all useful. Consequently, more Field Programmable Gate Arrays FPGAs may be required, in order to perform correlations with words containing large numbers of bits, than is desirable for reasons of bulk and interconnection complexity.

Improved or alternative correlator arrangements are desired.

SUMMARY OF THE INVENTION

An apparatus for correlating multibit first and second signals includes a multiplexer including a multibit input port coupled to receive the second signal, and also including a single-bit output port, for selectively coupling to its output port one bit at a time of the multibit second signal. A multiplier includes an output port, a first multibit input port and second single-bit input port. The single-bit input port is coupled to the output port of the multiplexer. The multiplier is coupled for receiving the first digital signals in parallel form, for controllably coupling to its output port a multibit product signal in response to the one bit of a second signal applied to its second input port. The multiplier, in another embodiment, multiplies the words of the first signal by +1 if the one bit of the second digital signal applied to its second input port has a logical value of 1 and by −1 if the one bit of the second digital signal applied to its second input port has a logical value of 0. The multiplier, in one embodiment, multiplies the words of the first signal by −1 if the one bit of the second digital signal applied to its second input port has a logical value of 1 and by +1 if the one bit of the second digital signal applied to its second input port has a logical value of 0. The apparatus further includes summing means including an input port coupled to the output port of the multiplier, for summing the multibit product signals received from the multiplier with delayed parallel signals, to thereby produce summed parallel signals representing the correlated output. A delay means or arrangement is coupled to receive the summed parallel signals, for delaying the summed parallel signals for a number of clock cycles equal to the number of bits in the digital first signals, for thereby producing the delayed parallel signals.

In a particular embodiment of the arrangement, means are provided for coupling the words of the second signal to the first input port of the multiplier. The means may comprise a register clocked rate Clk/N lower than that of the multiplexer.

A particular embodiment of the arrangement further comprises a register having an input port coupled to receive the summed parallel signals representing the correlated output.

In another embodiment, the means for coupling the words of the first signal to the first input port of the multiplier comprises a first register clocked at a rate lower than that of the first multiplexer. This embodiment further comprises a clocked second register having an input port coupled to receive the summed parallel signals representing the correlated output, with the second register being clocked at the same rate as the first register. Initialization or cascading of the correlation apparatus may be provided by an embodiment which further comprises second multiplexing means coupled to the summing means, for applying an initialization value to the summing means.

A method for correlating first and second multibit signals includes the step of applying the first signals to a first input port of a multiplier, where the multiplier includes a single-bit second input port and an output port for a period of at least N clock cycles. The bits of the multibit second signal are gated to the single-bit second input port of the multiplier, for sequentially multiplying the first input signal by the individual bits of the second input signal, for thereby producing multiplied multibit signals. The multiplied multibit signals are applied to a first input port of an adder, which adder includes a second input port for receiving delayed signals, and also includes an output port at which added signals are generated. The added signals are delayed by a number of clock cycles at least equal to the number of bits in the first multibit signal, to thereby produce delayed signals. The delayed signals are applied to the second input port of the adder, whereby the added signals include the result of the correlation. The results of the correlation are extracted from the added signals.

An apparatus according to an aspect of the invention is for correlating M-bit first and second signals. The apparatus comprises a plurality of N-bit correlators, where N is less than M. Each of the N-bit correlators of the plurality comprises (a) an N-bit multiplexer including an N-bit input port coupled to receive a subset of bits of the M-bit second signal, and also including a single-bit output port, for selectively coupling to its output port one bit at a time of the subset of bits;

(b) a multiplier including an output port, a first multibit input port and second single-bit input port, the single-bit input port of the multiplier being coupled to the output port of the multiplexer for receiving the one bit at a time, the multiplier being coupled for receiving the first signals in parallel form at its first input port, for controllably coupling to its output port a multibit product signal in response to that one bit of the second signal applied to its second input port, and for one of (a) multiplying the words of the first signal by +1 if the one bit of the second digital signal applied to its second input port has a logical value of 1 and by −1 if the one bit of the second digital signal applied to its second input port has a logical value of 0, and (b) multiplying the words of the first signal by −1 if the one bit of the second digital signal applied to its second input port has a logical value of 1 and by +1 if the one bit of the second digital signal applied to its second input port has a logical value of 0;

(c) summing means including an input port coupled to the output port of the multiplier, for summing the multiplied parallel signals received from the multiplier with delayed parallel signals, to thereby produce summed parallel signals representing the correlated output; and (d) delay means coupled to receive the summed parallel signals, for delaying the summed parallel signals for a number of clock cycles at least equal to the number of bits in the digital first signals, for thereby producing the delayed parallel signals.

The apparatus according to this aspect of the invention includes means for selectively applying the summed parallel signals representing the correlated output from one of the N-bit correlators to the next one of the N-bit correlators in the cascade.

A method according to another aspect of the invention is for correlating first and second multibit signals. The method comprises the step of applying the multibit first signals to a first input port of a multiplier which includes a single-bit second input port and an output port. The method further includes the step of, while the multibit first signals are applied to the first input port of the multiplier, sequentially gating the bits of the multibit second signal to the single-bit second input port of the multiplier, for sequentially multiplying the first input signal by the individual bits of the second input signal for thereby producing multiplied multibit signals. The multiplied multibit signals are applied to a first input port of an adder, which adder includes a second input port for receiving delayed signals, and an output port at which added signals are generated representing the sum of the multiplied multibit signals with the delayed signals. The added signals are delayed by a number of clock cycles at least equal to the number of bits in the first multibit signal, to thereby produce the delayed signals. The delayed signals are applied to the second input port of the adder, whereby the added signals include the result of the correlation. A particular mode of this method comprises the step of extracting the result of the correlation from the added signals.

BRIEF DESCRIPTION OF THE DRAWING

FIG. 1b is a simplified block diagram illustrating a correlator arrangement according to the prior art which may be used in the arrangement of FIG. 1a;

FIG. 2 is a simplified block diagram of a correlator arrangement according to an aspect of the invention which may be used in the arrangement of FIG. 1a;

FIGS. 3a and 3b illustrate the relative timing of certain clock signals used in the arrangement of FIG. 2; and FIG. 4 is a simplified block diagram illustrating the cascading of a plurality of correlator arrangements such as that of FIG. 2.

DESCRIPTION OF THE INVENTION

Figure 2:
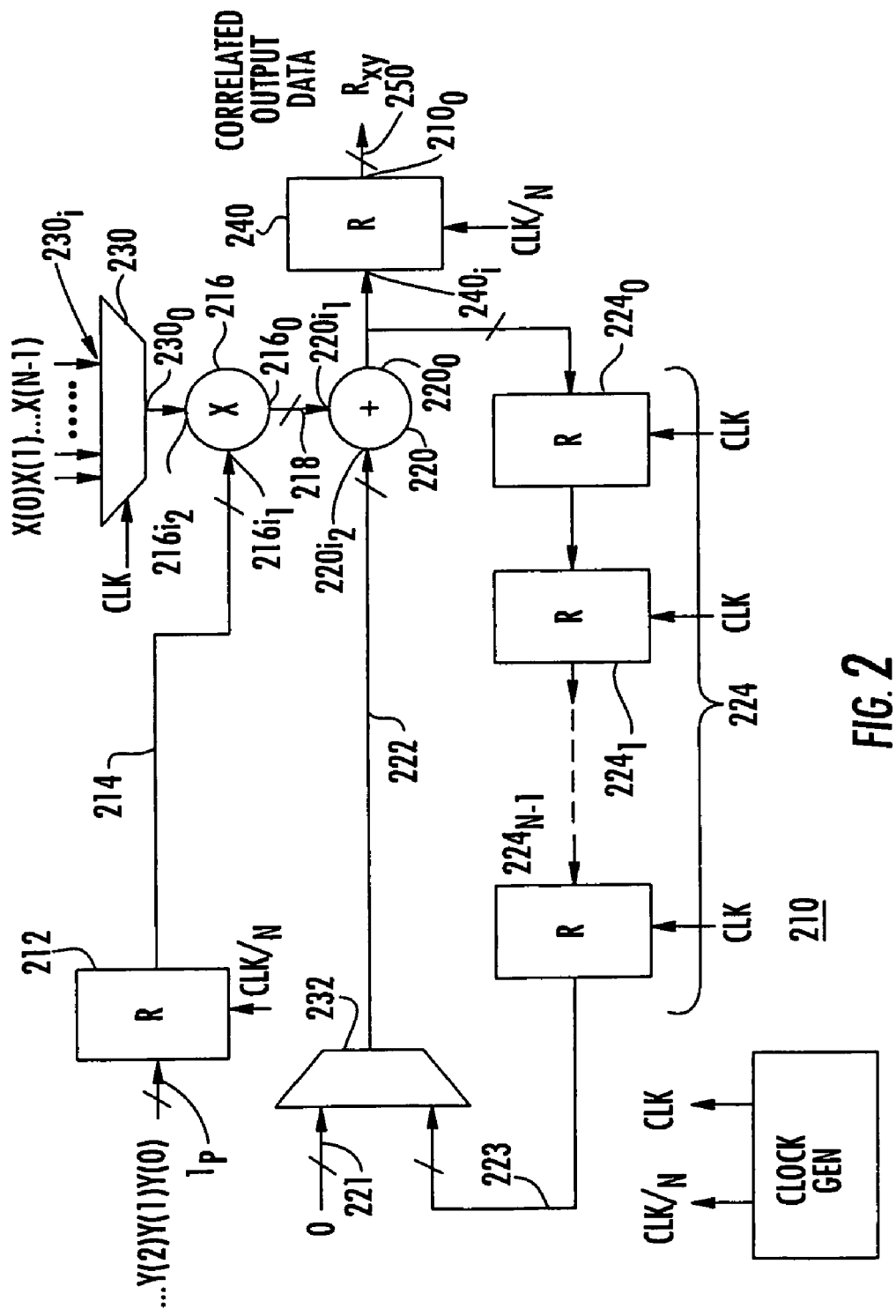

FIG. 2 shows an N-bit correlator which can be cascaded with M−1 other similar correlators to constitute a correlator capable of handling MN-bit signals.

Figure 1A:
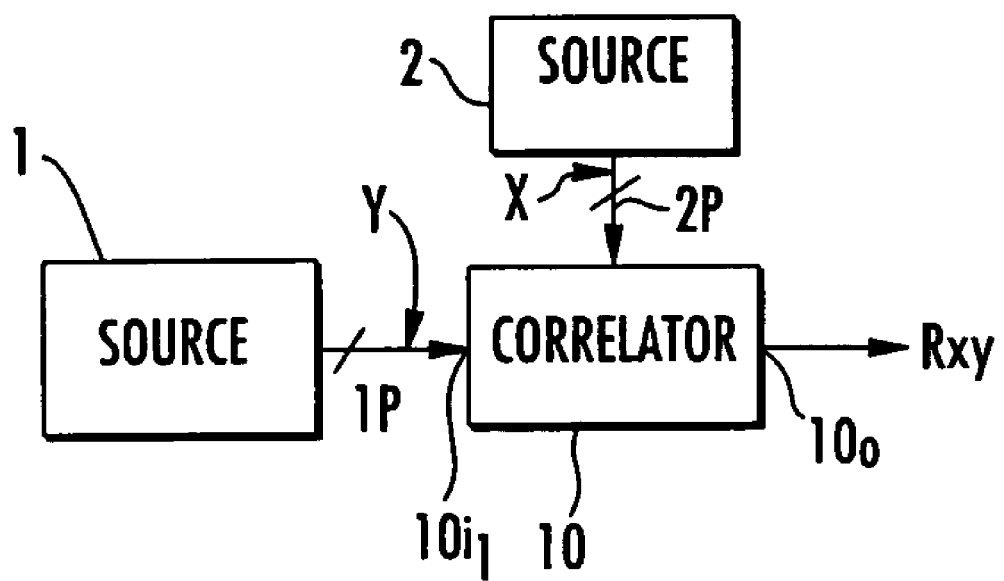
FIG. 1a is a simplified overall block diagram of a prior-art correlator including its sources.
Figure 1B:
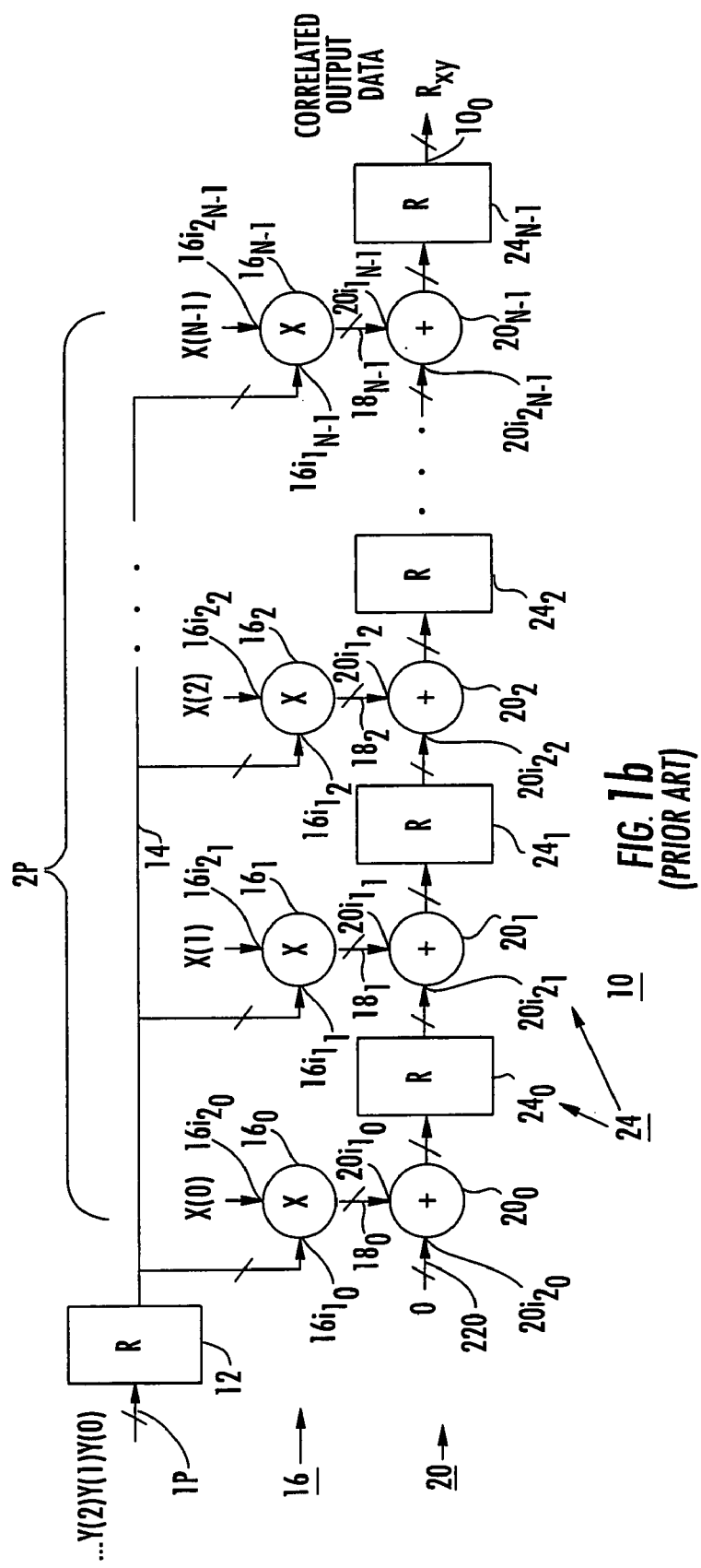

The arrangement of FIG. 2 accepts the multibit Y words from a path 1p at a register (R) 212 which is clocked or gated by a clock signal CLK/N, which occurs once every N CLK cycles, as illustrated in FIGS. 3a and 3b. At each gating cycle, the multibit Y word is gated onto a multibit bus 214 and applied to a multiplier 216. Multiplier 216 is similar to a multiplier of set 16 of FIG. 1b, in that it includes a multibit input port $216i_1$ and a single-bit input port $216i_2$, and it either inverts or noninverts (passes unchanged) the multibit Y signal applied to the multibit input port $216i_1$ depending upon the state of the single-bit signal applied to its single-bit input port $216i_2$. The multiplied multibit signal produced by multiplier 216 of FIG. 2 is applied over a multibit path 218 to a first or addend input port 220i1 of an adder or summer designated 220. Adder 220 adds the addend applied to its first input port 220i1 to the augend applied by way of a multibit path 222 to its second input port 220i2, and produces a summed signal at its output port 220o. The summed signal produced by adder 220 includes the correlation signal, which is applied to a clocked output register (R) 240, which clocks the correlation signal $R_{XY}$ from an output port 210o to a user apparatus (not illustrated) by way of a path 250.

The summed signal produced by adder 220 of FIG. 2 is also applied to a delay circuit designated generally as 224, which includes a plurality of N clocked registers $224_0$, $224_1$, . . . , $224_{N-1}$. The delay circuit 224 delays the summed signal produced by adder 220 by N clock cycles, and applies the summed signal multibit bus 222 by way of a multibit multiplexer 232. Multiplexer 232 is used for two different purposes. The first purpose is to initialize one section (the illustrated section) of the correlator 210 by applying a zero to bus 222 at the beginning of each correlation. The second purpose is to initialize the illustrated section of the correlator when it is used in a cascade with other such sections for handling multibit words having numbers of bits greater than N.

Correlator 210 of FIG. 2 also includes a further multiplexer designated 230. Multiplexer 230 is clocked at the CLK rate, for applying one bit at a time of the multibit X signal to second input port 216i2 of multiplier 216. Thus, multiplier 216 sequentially multiplies the same N-bit Y word by each bit of the X word, to produce a product for application to adder 220. After the first N CLK cycles of operation, the delayed sum signal applied by way of bus 222 to second input port 220i2 of adder 220 in general has a nonzero value.

The step-by-step operation can be understood by reference to FIG. 2 in conjunction with the CLK and CLK/N clock signals of FIGS. 3a and 3b, respectively. FIG. 3a illustrates the system clock CLK, and FIG. 3b illustrates the reduced-rate clock CLK/N. The CLK pulses are numbered in two different ways, (a) by absolute number of cycles starting from zero value (that is, starting at 0 and proceeding monotonically to some number MN, where M is large), and (b) modulus N (that is, a repeating cycle of 0, 1, 2, 3, . . . N−1, N). Initially (that is, at CLK=0) all registers are cleared in the arrangement 210 of FIG. 2. During Clock Cycle 1 of FIGS. 3a and 3b (corresponding to the $0^{th}$ occurrence of CLK of FIG. 3a and the $0^{th}$ occurrence of CLK/N of FIG. 3b), the value at the output port 220o of adder 220 is stored in register 240. Also during the $0^{th}$ CLK/N clock cycle, a new multibit value of Y is stored in register 212 and becomes available on bus 214, multiplexer 230 is set to output the single bit X(0), and multiplexer 232 is set to output a value of 0 from path 221. Multiplier 216 multiplies the multibit word Y(0) with (by) bit X(0), which is the first bit of the X word. The inverted or noninverted product produced by multiplier 216 is applied to adder 220, which adds zero from bus 222 with the product produced by multiplier 216 at port 216o.

During the next CLK cycle, (the second occurrence of CLK of FIG. 3a or CLK cycle 1), the output from port 220o of adder 220 is stored in shift register $224_0$, and the contents of the registers of delay 224 shift toward the output of the delay (toward the left in FIG. 2). Also, multiplexer 232 is set to output the signal on path 223, and multiplexer 230 is set to output X(1), the second bit of the X word. Multiplier 216 multiplies multibit word Y(0) with bit X(1) to produce the inverted or noninverted product at port 216o. Adder 220 adds together the output of multiplexer 232 with product at the output port 216o of multiplier 216.

During the third clock cycle of FIG. 3a, corresponding to CLK pulse 2, the output from port 220o of adder 220 is transferred into shift register $224_0$, and the words stored in the other registers of delay 224 shift one register to the left. Multiplexer 230 is set to output bit X(2), which is the third bit of the X word. Multiplexer 232 is set to couple the output of register $224_{n-1}$ onto bus 222. Multiplier 216 multiplies Y(0) with X(2) to produce the inverted or noninverted product signal at its output port 216o. Adder 220 adds the output from of multiplexer 232 with the product from multiplier output port 216o. This procedure continues until the $N^{th}$ clock cycle (the last or $N-1^{th}$ clock cycle of the first set of FIG. 3a).

At the $N^{th}$ clock cycle (the last or $N-1^{th}$ clock cycle of the first set of FIG. 3a), the sum then at the output port 220o of adder 220 is stored in shift register $224_0$, and the contents of the shift registers of delay 224 are not shifted to the left; the output from register $224_{N-1}$ is the last zero value. Multiplexer 230 is set to output X(n) the last bit of the X word, and multiplexer 232 is set to output the zero-value word available on bus 223. Multiplier 216 multiplies Y(0) with X(n) to produce a product. Adder 220 adds the product from output port $216_0$ of multiplier 216 with output of multiplexer 232. This completes the correlation of the X word with the current Y word, Y(0). It should be noted that in the arrangement of FIG. 2, corresponding to the first correlator of a cascade of correlators, the value coupled by multiplexer 232 onto bus 222 is always zero. In other correlators of a cascade, the value coupled onto bus 222 may in general be nonzero.

At the next or $N+1^{th}$ clock cycle, which is the $0^{th}$ clock cycle of the second set of CLK pulses of FIG. 3a (and which corresponds to the second CLK/N pulse {pulse 1} of FIG. 3b), the next value or multibit word Y(1) of input signal Y is stored in register 212, and becomes available on bus 214. This second Y value or word will be correlated bit-by-bit with the same X word previously applied to the input of multiplexer 230. At the $N+1^{th}$ clock cycle (the $1^{th}$ CLK/N pulse), multiplexer 230 is set to output X(0). The sum signal then at the output port 220o of adder 220 is stored in register 240. Multiplier 216 multiplies Y(1) with X(0) to produce an inverted or noninverted product, depending upon the value of X(0). It will be noted that multiplexer 232 is again set to output the zero value from bus 221; the value of zero is applied to bus 222 at the beginning of each set of N clock cycles (or at each CLK/N clock cycle) when the structure 210 of FIG. 2 processes the N-least-significant-digits 0 through N of the large X and Y words being processed. However, when the structure 210 of FIG. 2 is used to process digits of significance greater than the least, multiplexer 232 is handled differently, as described below. Since arrangement 210 of FIG. 2 represents the lowest-significant-digit processing, adder 220 receives zero from multiplexer 232 and adds zero with output of multiplier 216o.

During CLK Cycle n+2 (CLK pulse N+1), the signal at output 220o of adder 220 is transferred into shift register $224_0$. Multiplexer 230 set to output X(1). Multiplexer 232 is set to couple onto bus 222 the output from register $224_{N-1}$. Multiplier 216 multiplies Y(1) with X(1). Adder 220 adds the output from the output port of multiplexer 232 with output 260o of multiplier 216.

The operation continues in like fashion. At CLK pulse or cycle 2n (corresponding once again to the $0^{th}$ cycle of the modulo-N clock), the signal at the output port 220o of adder 220 is transferred into shift register $224_0$. Multiplexer 230 set to output X(N). Multiplexer 232 set to couple to bus 222 the output of register $224_{N-1}$. Multiplier 216 multiplies Y(1) with X(n). Adder 220 adds the output of multiplexer 232 with output of multiplier 216o.

During CLK cycle $2_{N+1}$ (corresponding to the third CLK/N pulse, designated 2 in FIG. 3b) the output from adder output port 220o is stored in register 240. The next value of Y is stored in register 212, and multiplexer 230 is set to output X(0). Multiplexer 232 is set to couple onto bus 222 the output from register $224_{N-1}$. Multiplier 216 multiplies Y(2) with X(0), and adder 220 adds zero with the output of multiplier 216o. This process continues until all Y values have been processed against all the bits of X.

FIG. 4 is a simplified block diagram illustrating a structure 410 for the cascading of a plurality of N-bit correlators such as 210 of FIG. 2 in order to correlate X and Y values having large numbers of bits. In the cascade of FIG. 4, each of the N-bit correlators of the cascade (except the first) receives partial correlation results from the previous N-bit correlator of the cascade, and receives a different set of X bits from the entire X word. Each of the N-bit correlators of FIG. 4 also receives the entire Y-word. In FIG. 4, the left-most N-bit correlator is designated 210, to indicate its relationship to the structure of FIG. 2. More particularly, in structure 410, the multibit Y word is applied to port 1P of N-bit correlator 210, as in FIG. 2. The multibit Y word is also applied to the corresponding input ports 1P', 1P'', ..., $1P_s$ of N-bit correlators 210', 210'', ..., $210_s$. The correlated output is taken from output 210o of N-bit correlator 210 on signal path 250 for application to the input port 221' of N-bit correlator 210', the correlated output is taken from output 210o' of N-bit correlator 210' on signal path 250' for application to the input port 221'' of N-bit correlator 210'', and the correlated output is taken from the penultimate N-bit correlator (not illustrated) for application to the input port $221_s$ of N-bit correlator $210_s$. The X word bits which are applied to second N-bit correlator 210' are X(N), X(N+1), ..., X(2N). The results of correlation by second N-bit correlator 210' are generated at its output port 210o', and are coupled over a path 250' to the input port 1P''' of a third N-bit correlator 210''. Third N-bit correlator 210'' receives X bits X(2N+1), X(2N+2), ..., X(3N) and correlates them with the partial results applied to its input port 1P'''. This process continues until the partial results are applied to the input port $221_s$ of last N-bit correlator $210_s$. Last N-bit correlator $210_s$ receives X bits X((S-1)N), ..., X(SN), and correlates with the X words the partial correlation applied to its input port $221_s$, to produce the correlation $R_{xy}$ at a cascade output port 410o.

While the multiplier 216 of FIG. 2 has been described as multiplying the Y word by +1 if the current bit of the X word is a logic 1 and by −1 if the current bit of the X word is a logic 0, it can instead multiply the Y word by −1 if the current bit of the X word is logic 1 and by +1 if the current bit of the X word is logic 0.

In general, an apparatus for correlating multibit first and second words according to an aspect of the invention includes a multiplexer for selecting one bit at a time of the second word, and applying the bit to a multiplier which receives the first word, for generating a product by inverting or noninverting the first word. The product is applied to an adder and is added to a delayed parallel signal to produce a sum signal. The sum signal is delayed in an amount related to the number of bits in the first word to produce the delayed parallel signal. A plurality of such apparatuses are cascaded, with the bits of the second word applied in subsets to the apparatuses, and the partial correlations applied as input words to the next apparatus in the cascade.

An apparatus (210) according to an aspect of the invention is for correlating multibit first (Y) and second (X) signals. The apparatus (210) includes a multiplexer (230) with a multibit input port (230i) coupled to receive the second signal (X), and also includes a single-bit output port (230O), for selectively coupling to its output port (230o) one bit at a time of the multibit second signal (X). A multiplier (216) includes an output port, (216o), a first multibit input port ($216_{i1}$) and second single-bit input port ($216_{i2}$) coupled to the output port (230o) of the multiplexer (230). The multiplier (216) is coupled for receiving the first signals (Y) in parallel form (at its first input port 216i1), for controllably coupling to its output port (216o) a multibit product signal in response to the one bit of the second signal (X) applied to its second input port (216i2). The multiplier (216), in one embodiment, multiplies the words of the first signal (Y) by +1 if the one bit of the second digital signal (X) applied to its second input port (230i2) has a logical value of 1 and by −1 if the one bit of the second digital signal (X) applied to its second input port (230i2) has a logical value of 0. The multiplier (216), in another embodiment, multiplies the words of the first signal (Y) by −1 if the one bit of the second digital signal (X) applied to its second input port (230i2) has a logical value of 1 and by +1 if the one bit of the second digital signal (X) applied to its second input port (230i2) has a logical value of 0. The apparatus (210) further includes summing means (220) including an input port (220i1) coupled to the output port (2160) of the multiplier (216), for summing the multibit product signals received from the multiplier (216) with delayed parallel signals (applied over path 222), to thereby produce (at port 220o) summed parallel signals representing the correlated output. A delay means or arrangement (224, 232) is coupled to receive the summed parallel signals, for delaying the summed parallel signals for a number of clock cycles N equal to the number of bits (N) in the digital first signals (X), for thereby producing the delayed parallel signals.

A particular embodiment of the arrangement (210), includes means for coupling the words of the second signal (Y) to the first input port (216i1) of the multiplier (216). The means for coupling may comprise a register (212) clocked at a rate (Clk/N) lower than that of the multiplexer (230).

A particular embodiment of the arrangement (210) further comprises a clocked register (240) having an input port (240i) coupled to receive the summed parallel signals representing the correlated output.

In another embodiment, the means for coupling the words of the first signal (Y) to the first input port (216i1) of the multiplier (216) comprises a first register (212) clocked at a rate lower than that of the first multiplexer (230). This embodiment further comprises a clocked second register (240) having an input port (240i) coupled to receive the summed parallel signals representing the correlated output, with the second register (240) being clocked at the same, rate as the first register (212).

Initialization or cascading of the correlation apparatus (210) may be provided by an embodiment which further comprises second multiplexing means (232) coupled to the summing means (220), for applying an initialization value to the summing means (220).

A method for correlating first and second multibit signals includes the step of applying the first signals (Y) to a first input port (216i1) of a multiplier (216), where the multiplier (216) includes a single-bit second input port (216i2) and an output port (216o). The application of the first signal is for a period of at least N clock cycles. The bits of the multibit second signal (X) are gated (230) to the single-bit second input port (216i2) of the multiplier (216), for sequentially multiplying the first input signal (Y) by the individual bits of the second input signal (X), for thereby producing multiplied multibit signals (at port 216o). The multiplied multibit signals are applied to a first input port (220i1) of an adder (220), which adder (220) includes a second input port (220i2) and an output port (220o) at which added signals are generated. The added signals are delayed (214) by a number of clock cycles at least equal to the number of bits (N) in the first multibit signal (X), to thereby produce delayed signals. The delayed signals are applied to the second input port (220i2) of the adder (220), whereby the added signals (at port 220O) include the result (Rxy) of the correlation. The results of the correlation are extracted (240) from the added signals.

An apparatus (410) according to an aspect of the invention is for correlating M-bit first (Y) and second (X) signals. The apparatus (410) comprises a plurality of N-bit correlators (210, 210', 210", . . . , $210_s$), where N is less than M. Each of the N-bit correlators (210, 210', 210", . . . , $210_s$) of the plurality comprises (a) an N-bit multiplexer including an N-bit input port (230i) coupled to receive a subset of bits of the M-bit second (X) signal, and also including a single-bit output port (230o), for selectively coupling to its output port (230o) one bit at a time of the subset of bits (of X);

(b) a multiplier (216) including an output port (216o), a first multibit input port (216i1) and second single-bit input port (216i2), the single-bit input port (216i2) of the multiplier (216) being coupled to the output port (230o) of the multiplexer (230) for receiving the one bit at a time, the multiplier (216) being coupled for receiving the first signals (Y) in parallel form at its first input port (216i1), for controllably coupling to its output port (216o) a multibit product signal in response to that one bit of the second signal (X) applied to its second input port (216i2), and for one of (a) multiplying the words of the first signal (Y) by +1 if the one bit of the second digital signal (X) applied to its second input port (216i2) has a logical value of 1 and by −1 if the one bit of the second digital signal (X) applied to its second input port (216i2) has a logical value of 0, and (b) multiplying the words of the first signal (Y) by −1 if the one bit of the second digital signal (X) applied to its second input port (216i2) has a logical value of 1 and by +1 if the one bit of the second digital signal (X) applied to its second input port (216i2) has a logical value of 0;

(c) summing means (220) including an input port (220i1) coupled to the output port (216o) of the multiplier (216), for summing the multiplied parallel signals received from the multiplier (216) with delayed parallel signals (on bus 222), to thereby produce summed parallel signals (at port 220o) representing the correlated output; and (d) delay means (224) coupled to receive the summed parallel signals, for delaying the summed parallel signals for a number of clock cycles at least equal to the number of bits in the digital first signals (Y), for thereby producing the delayed parallel signals (on bus 222).

The apparatus (410) according to this aspect of the invention includes means (240; 250, 250', 250", . . . ) for selectively applying the summed parallel signals representing the correlated output from one (210) of the N-bit correlators to the next one (210') of the N-bit correlators (210) in the cascade (410).

A method according to another aspect of the invention is for correlating first (Y) and second (X) multibit signals. The method comprises the step of applying the multibit first (Y) signals to a first input port 216i2 of a multiplier (216) which includes a single-bit second input port (216i2) and an output port (216*o*). The method further includes the step of, while the multibit first signals (Y) are applied to the first input port (216*i*1) of the multiplier (216), sequentially gating (by 230) the bits of the multibit second signal (X) to the single-bit second input port (216*i*2) of the multiplier (216), for sequentially multiplying the first input signal (Y) by the individual bits of the second (X) input signal for thereby producing (on path 218) multiplied multibit signals. The multiplied multibit signals are applied to a first input port (220*i*1) of an adder (220), which adder (220) includes a second input port (220*i*2) for receiving delayed signals (from path 222), and an output port (220*o*) at which added signals are generated representing the sum of the multiplied multibit signals with the delayed signals. The added signals are delayed (224) by a number of clock cycles at least equal to the number of bits in the first multibit signal (Y), to thereby produce the delayed signals. The delayed signals are applied to the second input port (220*i*2) of the adder, whereby the added signals include the result of the correlation. A particular mode of this method comprises the step of extracting the result (240) of the correlation from the added signals.

What is claimed is:

1. An apparatus for correlating M-bit first and second signals comprises:
   a plurality of N-bit correlators, where N is less than M, each of said N-bit correlators of said plurality comprising:
   (a) an N-bit multiplexer including an N-bit input port coupled to receive a subset of bits of said M-bit second signal, and also including a single-bit output port, for selectively coupling to its output port one bit at a time of the subset of bits;
   (b) a multiplier including an output port, a first multibit input port and second single-bit input port, said single-bit input port of said multiplier being coupled to the output port of said multiplexer for receiving said one bit at a time, said multiplier being coupled for receiving the first signals in parallel form at its first input port, for controllably coupling to its output port a multibit product signal in response to that one bit of said second signal applied to its second input port, and for one of (a) multiplying the words of the first signal by +1 if the one bit of the second digital signal applied to its second input port has a logical value of 1 and by −1 if the one bit of the second digital signal applied to its second input port has a logical value of 0, and (b) multiplying the words of the first signal by −1 if the one bit of the second digital signal applied to its second input port has a logical value of 1 and by +1 if the one bit of the second digital signal applied to its second input port has a logical value of 0;
   (c) a summer including an input port coupled to the output port of the multiplier, for summing the multiplied parallel signals received from the multiplier with delayed parallel signals, to thereby produce summed parallel signals representing the correlated output; and
   a delay circuit coupled to receive the summed parallel signals, for delaying the summed parallel signals for a number of clock cycles at least equal to the number of bits in the digital first signals, for thereby producing the delayed parallel signals; and
   a clocked register for selectively applying said summed parallel signals representing the correlated output from one of said N-bit correlators to the next one of said N-bit correlators in a cascade.

2. An apparatus according to claim 1, further comprising a second register for coupling the words of the first signal to the first input port of the multiplier.

3. An apparatus according to claim 2, wherein:
   said multiplexer is clocked at a first rate; and
   said second register is clocked at a second rate lower than said first rate.

4. An apparatus according to claim 2, wherein:
   said second register is clocked at a rate lower than that of the multiplexer; and
   said clocked register having an input port coupled to receive the summed parallel signals representing the correlated output, with the second register being clocked at the same rate as the first register.

5. An apparatus according to claim 1, further comprising a second multiplexer coupled to the summer, for applying an initialization value to the summer, whereby the correlation apparatus may be initialized.

\* \* \* \* \*